(12) United States Patent
Tanaka

(10) Patent No.: US 6,895,287 B2
(45) Date of Patent: May 17, 2005

(54) CONTROL METHOD AND CONTROL APPARATUS

(75) Inventor: Masato Tanaka, Tokyo (JP)

(73) Assignee: Yamatake Corporation, Tokyo (JP)

(*) Notice: Subject to any disclaimer, the term of this patent is extended or adjusted under 35 U.S.C. 154(b) by 206 days.

(21) Appl. No.: 10/436,833

(22) Filed: May 13, 2003

(65) Prior Publication Data

US 2004/0015248 A1 Jan. 22, 2004

(30) Foreign Application Priority Data

May 21, 2002 (JP) ........................................ 2002-145799

(51) Int. Cl.[7] ............................................. G05B 13/02
(52) U.S. Cl. ............................ 700/37; 700/19; 700/45; 700/46; 700/52; 700/55; 700/68; 700/72; 700/277; 700/278; 700/282; 700/299; 702/99; 702/100; 706/906; 236/1
(58) Field of Search .............................. 700/19, 32, 37, 700/44–46, 52, 54, 55, 67, 68, 71, 72, 275–278, 282, 299, 300; 702/98–100; 236/1; 706/902, 903, 906

(56) References Cited

U.S. PATENT DOCUMENTS

| 4,349,869 | A | * | 9/1982 | Prett et al. ..................... 700/39 |
| 4,852,053 | A | * | 7/1989 | Turrie ........................... 700/31 |
| 5,329,441 | A | * | 7/1994 | Aoki et al. ..................... 701/50 |
| 5,457,625 | A | * | 10/1995 | Lim et al. ..................... 700/29 |
| 5,787,746 | A | * | 8/1998 | Ferreira ........................ 72/11.3 |
| 5,860,304 | A | * | 1/1999 | Anbe et al. .................... 72/9.1 |
| 6,058,708 | A | * | 5/2000 | Heinitz et al. ................ 60/602 |
| 6,144,897 | A | * | 11/2000 | Selliers ....................... 700/269 |
| 6,438,532 | B1 | * | 8/2002 | Kiji ............................. 706/45 |

FOREIGN PATENT DOCUMENTS

| GB | 2283582 | A | * | 5/1995 | ........... B60K/41/00 |

* cited by examiner

Primary Examiner—Anthony Knight
Assistant Examiner—Crystal J. Barnes
(74) Attorney, Agent, or Firm—Blakely Sokoloff Taylor & Zafman

(57) ABSTRACT

In a control method, the first controlled variable is made to coincide with a predetermined controlled variable set point. A relation variable representing the relationship between second controlled variables which are designated in advance from measured second controlled variables different from the first controlled variable so as to maintain a predetermined relationship is calculated. A control actuator is so controlled as to make the calculated relation variable coincide with a predetermined relation variable set point. The difference between the calculated relation variable and a relation variable set point corresponding to the calculated relation variable is calculated. The calculated difference is added to the measured first controlled variable. A manipulated variable is calculated by performing feedback control calculation so as to make the sum coincide with the controlled variable set point. The calculated manipulated variable is output to a corresponding control actuator. A control apparatus is also disclosed.

17 Claims, 9 Drawing Sheets

CONTROL METHOD AND CONTROL APPARATUS

BACKGROUND OF THE INVENTION

The present invention relates to a process control technique and, more particularly, to a control method and control apparatus for Processing a Plurality of Controlled Variables which process a plurality of controlled variables.

Some of control systems each having a plurality of controlled variable measurement points and a plurality of control actuators have the first purpose of maintaining one controlled variable at a predetermined value as a whole, and the second purpose of maintaining a relation variable (controlled variable difference, controlled variable ratio, or the like) representing the relationship between a plurality of controlled variables.

For example, a temperature control system as shown in FIGS. 9A and 9B is proposed.

In the temperature control system of FIG. 9A, temperature sensors TS0, TS1, and TS2 serving as measurement points for a plurality of controlled variables (temperatures PV0, PV1, and PV2), and heaters H1 and H2 serving as a plurality of control actuators are arranged in a tank R. The first purpose of this temperature control system is to control the temperature PV0 of the center in the tank R to a predetermined set point SP by the heaters H1 and H2.

To only control the temperature PV0 of the center in the tank R to a predetermined value, outputs from the heaters H1 and H2 are not uniquely determined. In other words, the temperature PV0 of the center may be maintained at a predetermined value while the temperature PV1 near the heater H1 is higher than the temperature PV2 near the heater H2. To the contrary, the temperature PV0 of the center may be maintained at a predetermined value while the temperature PV1 near the heater H1 is lower than the temperature PV2 near the heater H2.

The temperature PV0 of the center in the tank R is controlled to a predetermined value, and the temperature distribution in the tank R is also important. That is, when the temperature difference between the temperature PV1 near the heater H1 in the tank R and the temperature PV2 near the heater H2 must be set to a predetermined value d12, outputs from the heaters H1 and H2 are uniquely determined.

However, outputs from the heaters H1 and H2 which are uniquely determined change depending on the temperature condition in the tank R. Even if the temperature difference between the temperatures PV1 and PV2 is controlled to a predetermined value, the temperature difference may be maintained at the predetermined value with a high heater output or a low heater output under the influence of heat insulation or disturbance in the tank R. Thus, any feedback control system must be constructed.

In the conventional control system, as shown in FIG. 9B, control calculation units PID1 and PID2 are respectively arranged for the heaters H1 and H2 to constitute independent feedback control systems using the heaters H1 and H2 as actuators for the temperatures PV1 and PV2 near the heaters H1 and H2. The control algorithm of the control calculation units PID1 and PID2 is PID control.

In FIG. 9B, the temperature PV0 of the center in the tank R is not substantially contained in the control system. The relationship between the temperatures PV0, PV1, and PV2 are investigated in advance.

The values of the temperatures PV1 and PV2 for making the temperature PV0 of the center in the tank R coincide with the predetermined set point SP and making the temperature difference between the temperatures PV1 and PV2 near the heaters coincide with the set point d12 are specified in advance on the basis of the investigation result.

In actual control, the control calculation unit PID1 controls the heater H1, and maintains the temperature PV1 near the heater H1 at a predetermined temperature. The control calculation unit PID2 controls the heater H2, and maintains the temperature PV2 near the heater H2 at a predetermined temperature.

Another example of the arrangement in FIG. 9B is a temperature control system in which the temperature PV0 of the center in the tank R is made to coincide with the predetermined set point SP and the ratio (PV1−Tmr)/(PV2−Tmr) of the rises of the temperatures PV1 and PV2 near the heaters from room temperature Tmr is made to coincide with the predetermined set point d12.

As an example other than the temperature control system, there is proposed a pressure control system which mixes two types of gases and supplies the gas mixture at a predetermined pressure, as shown in FIG. 10.

The pressure control system comprises a pressure sensor PS0 which measures a pressure PV0 of a mixture of two types of gases, gas flow control valves Val1 and Val2 serving as control actuators which control the flow rates of two types of gases, and flow sensors FS1 and FS2 which measure the gas flow rates PV1 and PV2 controlled by the valves Val1 and Val2.

The pressure control system has the first purpose of making the pressure PV0 coincide with the predetermined set point SP, and the second purpose of making the flow rate ratio PV1/PV2 of the flow rates PV1 and PV2 coincide with the predetermined set point d12.

The above-described control systems must uniquely decide outputs from control actuators to proper values in order to satisfy a specific relationship between the second controlled variables PV1 and PV2 in a situation in which the control actuators are redundantly arranged to control the first controlled variable PV0.

In the prior art, a control system which independently controls the second controlled variables PV1 and PV2 near control actuators is constituted, as described above. The relationship between the controlled variables PV0, PV1, and PV2 is investigated in advance to adjust the first controlled variable PV0.

The temperature control system of FIG. 9B in which the temperature PV0 of the center in the tank R is made to coincide with the predetermined set point SP and the temperature difference between the temperature PV1 near the heater H1 and the temperature PV2 near the heater H2 is made to coincide with the predetermined set point d12 performs independent control of respectively controlling the temperatures PV1 and PV2 near the heaters to specific values.

In this temperature control system, the temperature PV0 of the center which is the first purpose is not always accurately maintained at the predetermined set point SP. For example, when an unexpected heating substance or endothermic substance enters the tank R, the temperature PV0 of the center is not maintained at the set point SP.

In the temperature control system of FIG. 9B, the temperatures PV0, PV1, and PV2 must be investigated in advance. The number of steps before actual control is large, substantially wasting the time.

Further, the temperature control system cannot meet a request of adjusting, in accordance with importance, the priority levels of the first purpose of making the temperature PV0 of the center in the tank R accurately coincide with the predetermined set point SP and the second purpose of making the temperature difference between the temperatures PV1 and PV2 near the heaters coincide with the predetermined set point d12.

These problems also occur in the temperature control system in which the temperature PV0 of the center in the tank R is made to coincide with a predetermined set point SP and the ratio (PV1−Tmr)/(PV2−Tmr) of the rises of the temperatures PV1 and PV2 from room temperature Tmr is made to coincide with the predetermined set point d12, and the pressure control system of FIG. 10 in which the pressure PV0 is made to coincide with the predetermined set point SP and the flow rate ratio PV1/PV2 of the flow rates PV1 and PV2 is made to coincide with the predetermined set point d12.

SUMMARY OF THE INVENTION

It is an object of the present invention to provide a control method and control apparatus capable of making the first controlled variable accurately coincide with a predetermined set point, making the relation variable between a plurality of second controlled variables coincide with a predetermined set point, and decreasing the number of steps of investigating the relationship between controlled variables in advance before actual control.

It is another object of the present invention to provide a control method and control apparatus capable of adjusting, in accordance with importance, the priority levels of the first purpose of making the first controlled variable accurately coincide with a predetermined set point and the second purpose of making the relation variable between the second controlled variables coincide with a predetermined set point.

To achieve the above objects, according to the present invention, there is provided a control method comprising the steps of making a first controlled variable coincide with a predetermined controlled variable set point, calculating a relation variable representing a relationship between second controlled variables which are designated in advance from measured second controlled variables different from the first controlled variable so as to maintain a predetermined relationship, and controlling a control actuator so as to make the calculated relation variable coincide with a predetermined relation variable set point, the controlling step including the steps of calculating a difference between the calculated relation variable and a relation variable set point corresponding to the calculated relation variable, adding the calculated difference to the measured first controlled variable, calculating a manipulated variable by performing feedback control calculation so as to make a sum coincide with the controlled variable set point, and outputting the calculated manipulated variable to a corresponding control actuator.

DESCRIPTION OF THE PREFERRED EMBODIMENTS

[First Embodiment]

The first embodiment of the present invention will be described in detail below with reference to the accompanying drawings.

In the present invention, a feedback control system having the first purpose of accurately controlling the first controlled variable has the second purpose of making a relation variable (controlled variable difference, controlled variable ratio, or the like) representing the relationship between a plurality of second controlled variables coincide with a predetermined value. When the relation variable deviates from a predetermined value, the deviation is added to the feedback value of the first controlled variable. A control actuator is so operated as to eliminate the deviation in this manner, which is the basic principle.

Figure 1:
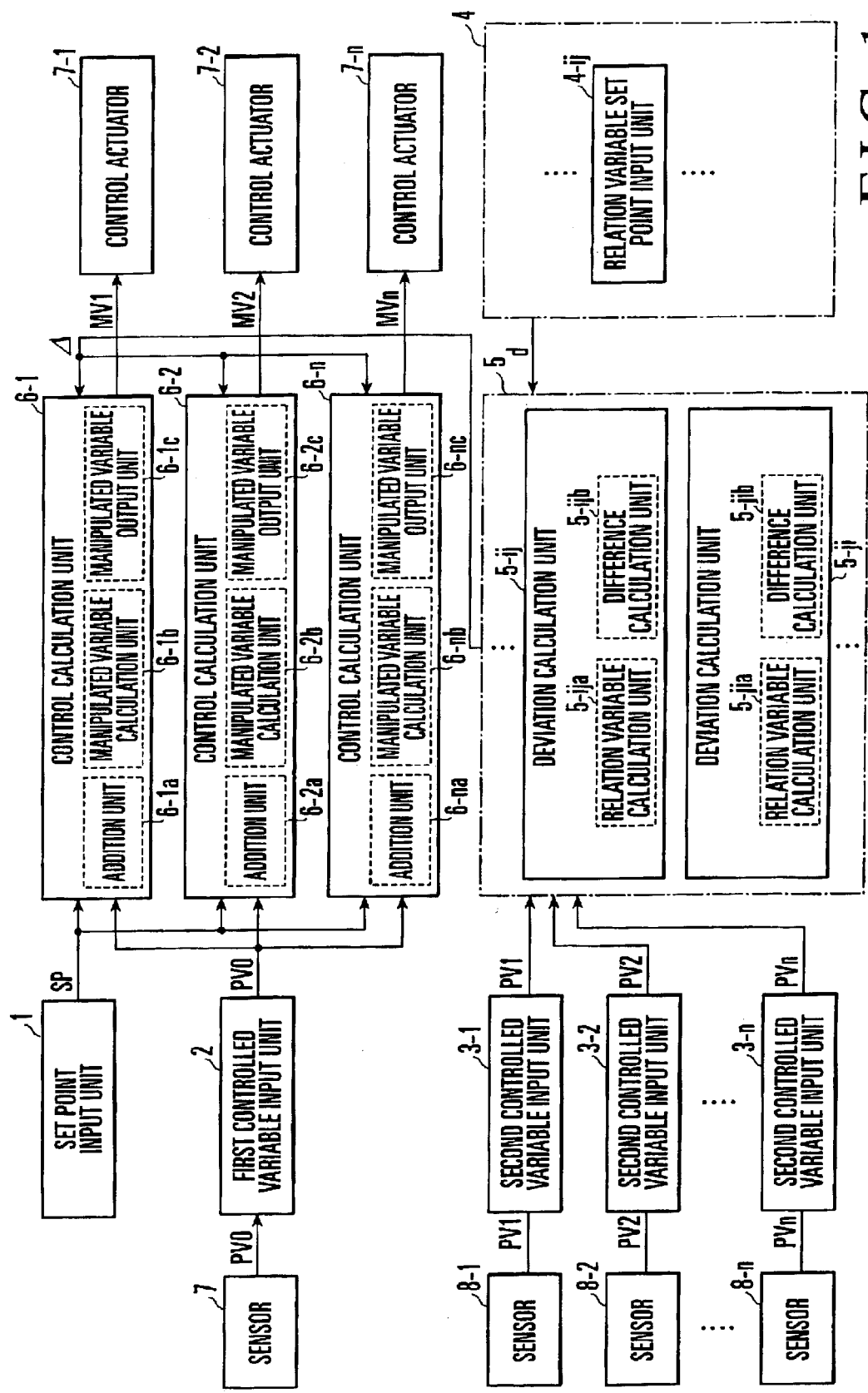
FIG. 1 is a block diagram showing the arrangement of a control apparatus according to the first embodiment of the present invention.

As shown in FIG. 1, a control apparatus according to the first embodiment comprises a set point input unit 1 which inputs a set point SP, a first controlled variable input unit 2 which is connected to a sensor 7 and inputs a first controlled variable PV0, and a plurality of second controlled variable input units 3 (3-1, 3-2, . . . , 3-$n$) ($n$ is an integer of 2 or more) which are respectively connected to a plurality of sensors 8 (8-1, 8-2, . . . , 8-$n$) and input second controlled variables PV1, PV2, . . . , PV$n$ ($n$ is an integer of 2 or more).

The control apparatus further comprises at least one deviation calculation unit 5 which is connected to the second controlled variable input units 3 (3-1, 3-2, . . . , 3-$n$) and calculates a deviation Δ, at least one relation variable set point input unit 4 which is connected to the deviation calculation unit 5 and inputs a relation variable set point d, and control calculation units 6 (6-1, 6-2, . . . , 6-$n$) which are connected to the set point input unit 1, first controlled variable input unit 2, and deviation calculation unit 5 and output a manipulated variable MV.

The set point input unit 1 inputs a set point SP for the first controlled variable PV0. The first controlled variable input unit 2 inputs a first controlled variable PV0 measured by the sensor 7 which is set at the first controlled variable measurement point.

The second controlled variable input units 3 (3-1, 3-2, . . . , 3-$n$) input a plurality of second controlled variables PV1, PV2, . . . , PV$n$ ($n$ is an integer of 2 or more) measured by the sensors 8 (8-1, 8-2, . . . , 8-$n$) which are set at a plurality of second controlled variable measurement points. The relation variable set point input unit 4 inputs a relation variable set point d for the relation variable (controlled variable difference, controlled variable ratio, or the like) between a plurality of second controlled variables.

The deviation calculation unit 5 comprises a relation variable calculation unit and difference calculation unit. The relation variable calculation unit calculates the relation variable between second controlled variables which are designated in advance from second controlled variables input from the second controlled variable input units 3 so as to maintain a predetermined relationship. The difference calculation unit calculates the deviation Δ serving as the difference between the calculated relation variable and a corresponding relation variable set point d.

Each control calculation unit 6 (6-1, 6-2, . . . , 6-n) comprises an addition unit, manipulated variable calculation unit, and manipulated variable output unit. The addition unit adds the deviation Δ calculated by the deviation calculation unit 5 to the first controlled variable PV0. The manipulated variable calculation unit calculates the manipulated variable MV by performing feedback control calculation so as to make the sum by the addition unit coincide with the set point SP. The manipulated variable output unit outputs the manipulated variable MV to a corresponding control actuator 7 (7-1, 7-2, . . . , 7-n).

The control apparatus can be implemented by a computer having an arithmetic device, storage device, and interface, and a program which controls these hardware resources.

The set point SP for the first controlled variable PV0 is set by the operator of the control apparatus. The set point SP is input to each control calculation unit 6 via the set point input unit 1 (step S101 in FIG. 2). The first controlled variable PV0 is measured by the sensor 7 which is set at the first controlled variable measurement point. The first controlled variable PV0 is input to the control calculation unit 6 via the first controlled variable input unit 2 (step S102).

A plurality of second controlled variables PV1, PV2, . . . , PVn are measured by the sensors 8 (8-1, 8-2, . . . , 8-n) which are set at a plurality of second controlled variable measurement points. The second controlled variables PV1, PV2, . . . , PVn are input to the deviation calculation unit 5 via corresponding second controlled variable input units 3 (step S103).

A relation variable set point dij for the relation variable (controlled variable difference, controlled variable ratio, or the like) between second controlled variables PVi and PVj (i≠j: i and j are integers of 1 (inclusive) to n (inclusive)) is set by the operator of the control apparatus. The relation variable set point dij is input to deviation calculation units 5-ij and 5-ji via a corresponding relation variable set point input unit 4-ij (step S104).

Note that the relation variable set point dij means a set-point for a controlled variable difference PVi–PVj when the relation variable between the second controlled variables PVi and PVj is a controlled variable difference, and a set point for a controlled variable ratio PVi/PVj when the relation variable is a controlled variable ratio.

A relation variable set point input unit corresponding to the relation variable set point dij will be referred to as a relation variable set point input unit 4-ij. Similarly, a deviation calculation unit which calculates the deviation between the relation variable set point dij, and the relation variable between the second controlled variables PVi and PVj will be referred to as deviation calculation units 5-ij and 5-ji.

The deviation calculation unit 5-ij calculates a deviation input to a control calculation unit 6-i which controls an actuator that mainly influences the second controlled variable PVi. The deviation calculation unit 5-ji calculates a deviation input to a control calculation unit 6-j which controls an actuator that mainly influences the second controlled variable PVj.

The deviation calculation unit 5 calculates the relation variable between second controlled variables which are designated in advance from the second controlled variables PV1, PV2, . . . , PVn input from the second controlled variable input units 3 so as to maintain a predetermined relationship, i.e., second controlled variables for which the relation variable set point d (d={dij}) is set. The deviation calculation unit 5 calculates the deviation Δ (Δ={Δij}) serving as the difference between the calculated relation variable and a corresponding relation variable set point d.

The deviation calculation unit 5 outputs the deviation Δ to a corresponding control calculation unit 6 (step S105). When a plurality of deviation calculation units 5 are arranged, they simultaneously perform processing.

The deviation calculation unit 5 properly calculates the sign of the deviation Δ such that the relation variable and relation variable set point d coincide with each other (deviation Δ is 0) by feedback control of the control calculation unit 6 which makes the sum of the deviation Δ and first controlled variable PV0 coincides with the set point SP. That is, the control calculation unit 6 performs feedback control so as to decreases the difference between the first controlled variable PV0 and the set point SP, and at the same time decrease the deviation Δ to 0.

For example, the deviation calculation unit 5-ij calculates the relation variable between the second controlled variables PVi and PVj, calculates the deviation Δij between the relation variable and the corresponding relation variable set point dij, and outputs the deviation Δij to the corresponding control calculation unit (control calculation unit corresponding to the control actuator 7-i which mainly influences the second controlled variable PVi) 6-i.

When the relation variable between the second controlled variables PVi and PVj is a controlled variable difference, the deviation calculation unit 5-ij calculates the controlled variable difference PVi-PVj, and calculates the deviation Δij:

$$\Delta ij = PVi - PVj - dij \qquad (1)$$

When the relation variable between the second controlled variables PVi and PVj is a controlled variable ratio, the deviation calculation unit 5-ij calculates the controlled variable ratio PVi/PVj, and calculates the deviation Δij:

$$\Delta ij = PVi/PVj - dij \qquad (2)$$

The deviation calculation unit 5-ji calculates the relation variable between the second controlled variables PVi and PVj, calculates the deviation Δji between the relation variable and the corresponding relation variable set point dij, and outputs the deviation Δji to the corresponding control calculation unit (control calculation unit corresponding to the control actuator 7-j which mainly influences the second controlled variable PVj) 6-j.

When the relation variable between the second controlled variables PVi and PVj is a controlled variable difference, the deviation calculation unit 5-ji calculates the deviation Δji:

$$\Delta ji = PVj - PVi + dij \qquad (3)$$

The deviation Δji is originally calculated by the same equation as that of the deviation Δij given by equation (1). To obtain sign matching, the deviation Δji is calculated using equation (3).

When the relation variable between the second controlled variables PVi and PVj is a controlled variable ratio, the relation variable between the second controlled variables PVi and PVj is defined as PVi/PVj, as described above. Hence, the deviation calculation unit 5-*ji* calculates the deviation Δji:

$$\Delta ji = dij - PVi/PVj \qquad (4)$$

The deviation Δji is originally calculated by the same equation as that of the deviation Δij given by equation (2). To obtain sign matching, the deviation Δji is calculated using equation (4).

The control calculation unit 6 adds the deviation Δ input from the deviation calculation unit 5 to the first controlled variable PV0 input from the first controlled variable input unit 2 (step S106). The control calculation unit 6 calculates the manipulated variable MV by performing feedback control calculation such that the sum coincides with the set point SP (step S107). The control calculation unit 6 outputs the calculated manipulated variable MV to a corresponding control actuator (step S108). When a plurality of control calculation units 6 are arranged for respective control actuators 7, the control calculation units 6 simultaneously perform processing.

Assume that two second controlled variable measurement points, two control actuators 7, and two control calculation units 6 are arranged (n=2). In this case, when the control algorithm is PID, a conventional control calculation unit corresponding to the control actuator 7-1 which mainly influences the second controlled variable PV1 performs feedback control calculation expressed by a transfer function using a Laplace operator s:

$$MV1 = Kg1\{1 + (1/Ti1s) + Td1s\}(SP - PV0) \qquad (5)$$

where MV1 is the manipulated variable for the control actuator 7-1 which mainly influences the second controlled variable PV1, and Kg1, Ti1, and Td1 are the proportional gain, integral time, and derivative time of the control calculation unit 6-1. In the first embodiment, the deviation Δ12 is added to the first controlled variable PV0, and thus equation (5) is rewritten into $$MV1 = Kg1\{1 + (1/Ti1s) + Td1s\}(SP - (PV0 + \Delta 12)) \qquad (6)$$

Similarly, when the control algorithm is PID, a conventional control calculation unit corresponding to the control actuator 7-2 which mainly influences the second controlled variable PV2 performs feedback control calculation expressed by a transfer function:

$$MV2 = Kg2\{1 + (1/Ti2s) + Td2s\}(SP - PV0) \qquad (7)$$

where MV2 is the manipulated variable for the control actuator 7-2 which mainly influences the second controlled variable PV2, and Kg2, Ti2, and Td2 are the proportional gain, integral time, and derivative time of the control calculation unit 6-2. In the first embodiment, the deviation Δ21 is added to the first controlled variable PV0, and thus equation (7) is rewritten into $$MV2 = Kg2\{1 + (1/Ti2s) + Td2s\}(SP - (PV0 + \Delta 21)) \qquad (8)$$

In this way, the control calculation units 6-1 and 6-2 calculate the manipulated variables MV1 and MV2 by equations (6) and (8). Operations in steps S101 to S108 are repeated every control cycle until control stops in response to an instruction from the operator or the like (step S109).

Detailed operation of the control apparatus according to the first embodiment will be explained.

Figure 9A:
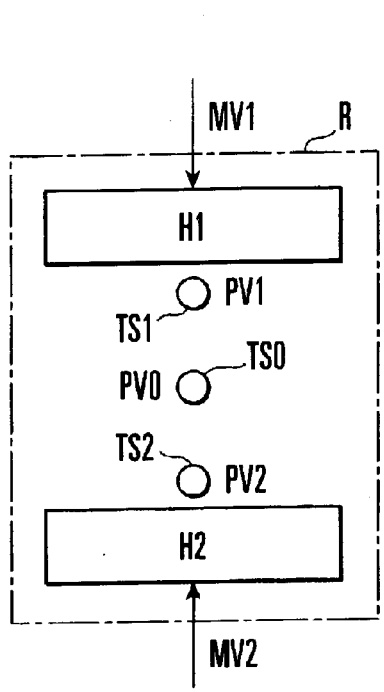
FIGS. 9A and 9B are block diagrams showing the arrangement of a conventional temperature control system.
Figure 9B:
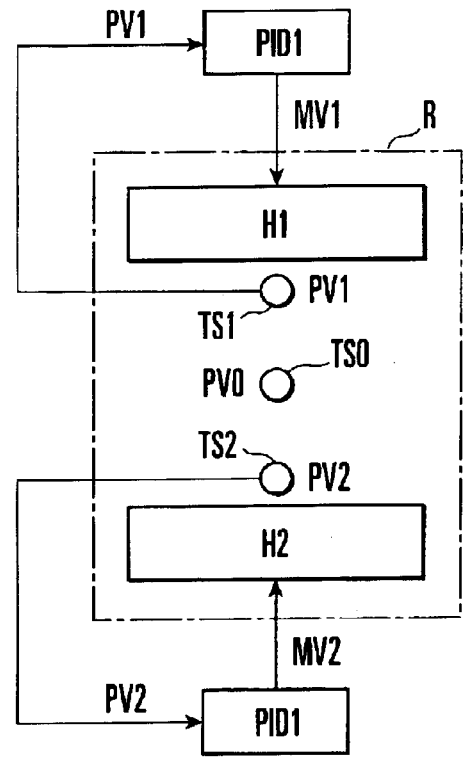
Figure 10:
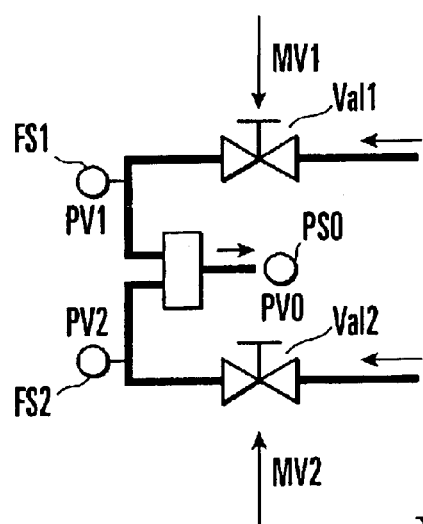
FIG. 10 is a circuit diagram showing the arrangement of a conventional pressure control system.

For example, as shown in FIGS. 9A and 9B, temperature sensors TS0, TS1, and TS2 which measure temperatures PV0, PV1, and PV2, and heaters H1 and H2 are arranged in a tank R. The first purpose is to make the temperature PV0 of the center in the tank R coincide with the set point SP. The second purpose is to make the temperature difference between the temperatures PV1 and PV2 near the heaters H1 and H2 coincide with the relation variable set point d12. In this case, the conventional control apparatus basically performs independent control of respectively controlling the temperatures PV1 and PV2 near the heaters to specific values.

Since one temperature PV0 is controlled by the two heaters H1 and H2, the manipulated variable outputs MV1 and MV2 to the heaters H1 and H2 are not uniquely decided in the conventional control apparatus. That is, the temperature PV0 of the center may be maintained at a predetermined value while the temperature PV1 near the heater H1 is higher than the temperature PV2 near the heater H2. To the contrary, the temperature PV0 of the center may be maintained at a predetermined value while the temperature PV1 near the heater H1 is lower than the temperature PV2 near the heater H2.

The temperature difference between the temperatures PV1 and PV2 near the heaters H1 and H2 converges to an arbitrary state depending on the situation, and does not settle at a specific value.

A case wherein the temperature difference PV1−PV2 is larger than the relation variable set point d12 at given time when the temperature difference PV1−PV2 serving as the relation variable between the temperatures PV1 and PV2 is to be set to a predetermined relation variable set point d12 will be explained. In this case, since the temperature difference PV1−PV2 must be decreased, it is required to decrease an output from the heater H1 and increase an output from the heater H2.

According to the first embodiment, the control calculation unit 6-1 corresponding to the heater H1 adds a positive value: deviation Δ12=PV1−PV2−d12 to the first controlled variable PV0, as represented by equations (1) and (6). The control calculation unit 6-1 performs feedback control calculation so as to maintain the sum at the set point SP. The control calculation unit 6-1 so operates as to calculate a manipulated variable MV1 smaller than that obtained by conventional feedback control calculation in equation (5).

Similarly, the control calculation unit 6-2 corresponding to the heater H2 adds a negative value: deviation Δ21=PV2−PV1+d12 to the first controlled variable PV0, as represented by equations (3) and (8). The control calculation unit 6-2 performs feedback control calculation so as to maintain the sum at the set point SP. The control calculation unit 6-2 so operates as to calculate a manipulated variable MV2 larger than that obtained by conventional feedback control calculation in equation (7).

This control calculation repetitively continues by the control calculation units 6-1 and 6-2. Finally, the manipulated variable outputs MV1 and MV2 to the heaters H1 and H2 are uniquely converged such that the deviation Δ12=PV1−PV2−d12=0 and Δ21=PV2−PV1+d12=0 are established and PV0=SP holds.

As described above, the first embodiment can make the first controlled variable PV0 accurately coincide with a predetermined set point SP, and make the relation variable (controlled variable difference, controlled variable ratio, or the like) between second controlled variables coincide with a predetermined relation variable set point d.

[Second Embodiment]

Figure 3:
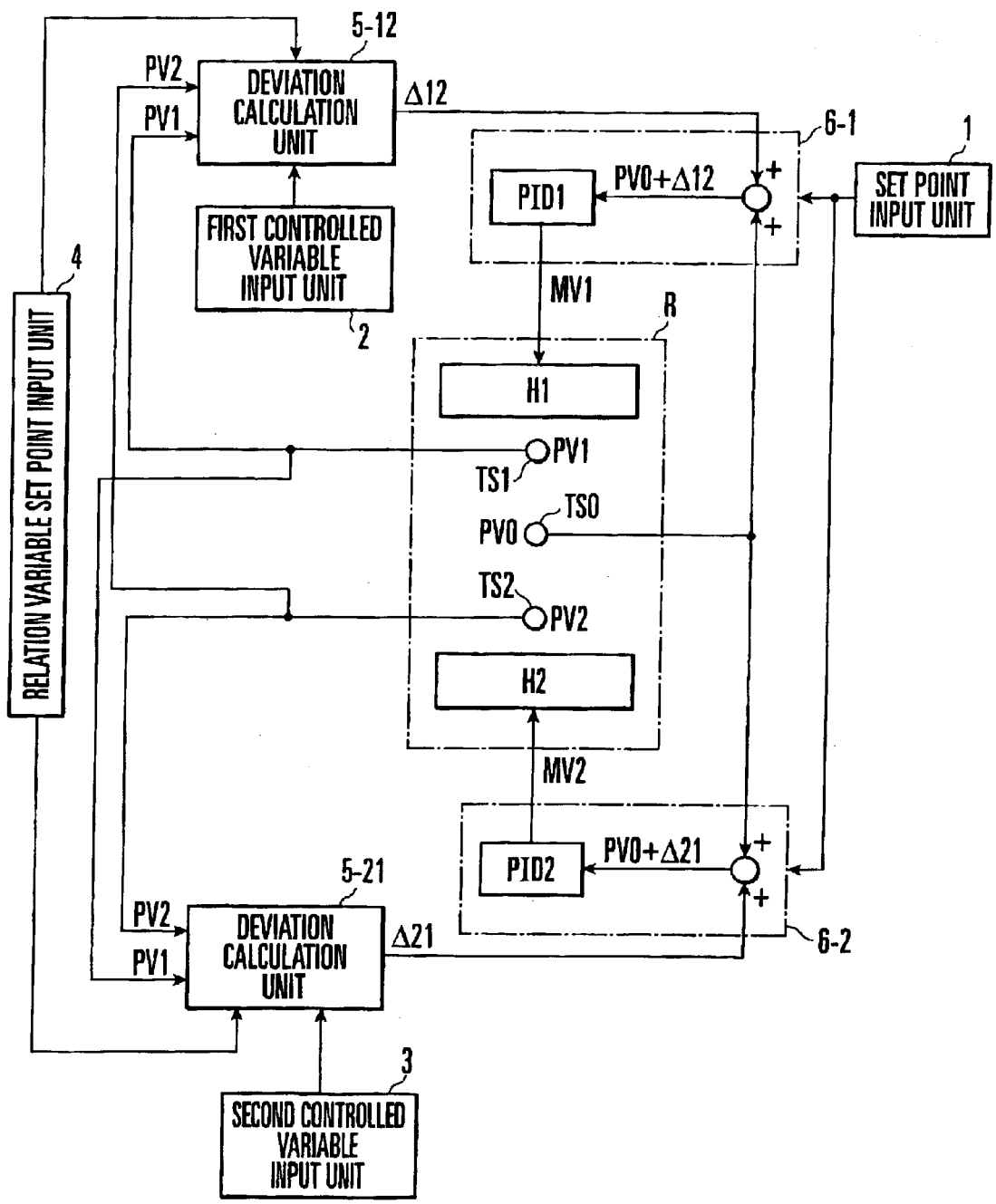
FIG. 3 is a block diagram showing the arrangement of a control apparatus according to the second embodiment of the present invention.

The second embodiment is a more detailed example of the first embodiment, as shown in FIG. 3, and describes temperature difference control in the use of two control actuators (heaters H1 and H2). A control apparatus comprises deviation calculation units 5-12 and 5-21, and control calculation units 6-1 and 6-2.

In a temperature control system according to the second embodiment, temperature sensors TS0, TS1, and TS2 which measure temperatures PV0, PV1, and PV2, and heaters H1 and H2 are arranged in a tank R. The first purpose is to make the temperature (first controlled variable) PV0 of the center in the tank R coincide with a predetermined set point SP. The second purpose is to make the temperature difference (controlled variable difference) between the temperatures (second controlled variables) PV1 and PV2 near the heaters H1 and H2 coincide with a predetermined relation variable set point d12.

Figure 2:
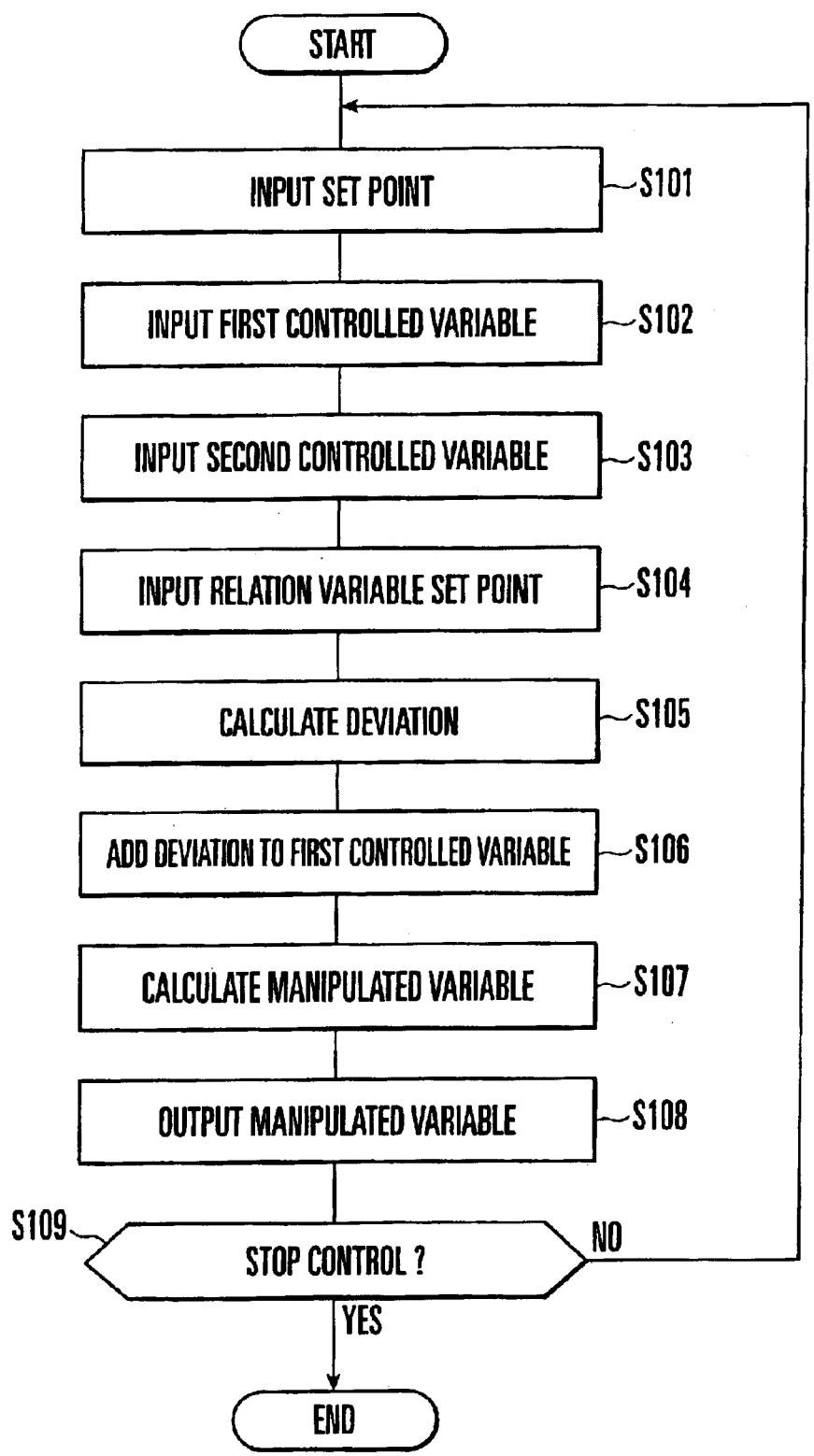
FIG. 2 is a flow chart showing the operation of the control apparatus in FIG. 1.

Also in the second embodiment, the processing flow of the control apparatus is the same as that shown in FIG. 2.

The deviation calculation unit 5-12 calculates a deviation Δ12 between a temperature difference PV1−PV2 and the relation variable set point d12 as a deviation Δ12 added to the first controlled variable PV0 in equation (6) by the following equation expressed by a transfer function on the basis of the second controlled variables PV1 and PV2 which are measured by the temperature sensors TS1 and TS2 and input from a second controlled variable input unit 3, and the relation variable set point d12 input from a relation variable set point input unit 4:

$$\Delta 12 = (PV1 - PV2 - d12)K12/(1 + T12s) \quad (9)$$

The deviation calculation unit 5-21 calculates a deviation Δ21 between the temperature difference PV1−PV2 and the relation variable set point d12 as a deviation Δ21 added to the first controlled variable PV0 in equation (8) by the following equation expressed by a transfer function on the basis of the second controlled variables PV1 and PV2 and the relation variable set point d12:

$$\Delta 21 = (PV2 - PV1 + d12)K21/(1 + T21s) \quad (10)$$

In equations (9) and (10), K12 and K21 are gains for weighting the temperature difference between the temperatures PV1 and PV2 in accordance with the importance of coincidence with the relation variable set point d12. The gains are positive values larger than 0, and are generally 1.

When the first purpose of making the temperature PV0 coincide with the set point SP is more important than the second purpose of making the temperature difference between the temperatures PV1 and PV2 coincide with the relation variable set point d12, the gains K12 and K21 are set small. When the second purpose is more important than the first purpose, the gains K12 and K21 are set large.

T12 and T21 are first-order lag filter time constants for avoiding abrupt changes in the deviations Δ12 and Δ21 caused by a change in the relation variable set point d12. The first-order lag filter time constants T12 and T21 suffice to be set almost equal to, e.g., integral times Ti1 and Ti2 of the control calculation units 6-1 and 6-2. In the second embodiment, T12=Ti1 and T21=Ti2.

The control calculation unit 6-1 calculates a manipulated variable output MV1 to the heater H1 by equation (6) on the basis of the set point SP input from a set point input unit 1, the first controlled variable PV0 which is measured by the temperature sensor TS0 and input from a first controlled variable input unit 2, and the deviation Δ12 (see equation (9)) input from the deviation calculation unit 5-12.

Similarly, the control calculation unit 6-2 calculates a manipulated variable output MV2 to the heater H2 by equation (8) on the basis of the set point SP, the first controlled variable PV0, and the deviation Δ21 (see equation (10)) input from the deviation calculation unit 5-21.

In this fashion, the second embodiment can make the temperature PV0 of the center in the tank R accurately coincide with the set point SP, and make the temperature difference between the temperatures PV1 and PV2 near the heaters H1 and H2 coincide with the relation variable set point d12.

Further, the second embodiment can adjust the priority levels of the first purpose of making the temperature PV0 coincide with the set point SP by the gains K12 and K21, and the second purpose of making the temperature difference between the temperatures PV1 and PV2 coincide with the relation variable set point d12.

In the second embodiment, time lag filtering is executed for the deviation Δ by the filter time constants T12 and T21. Abrupt changes in the deviations Δ12 and Δ21 by a change in the relation variable set point d12 during control can be avoided, realizing stable control.

[Third Embodiment]

Figure 4:
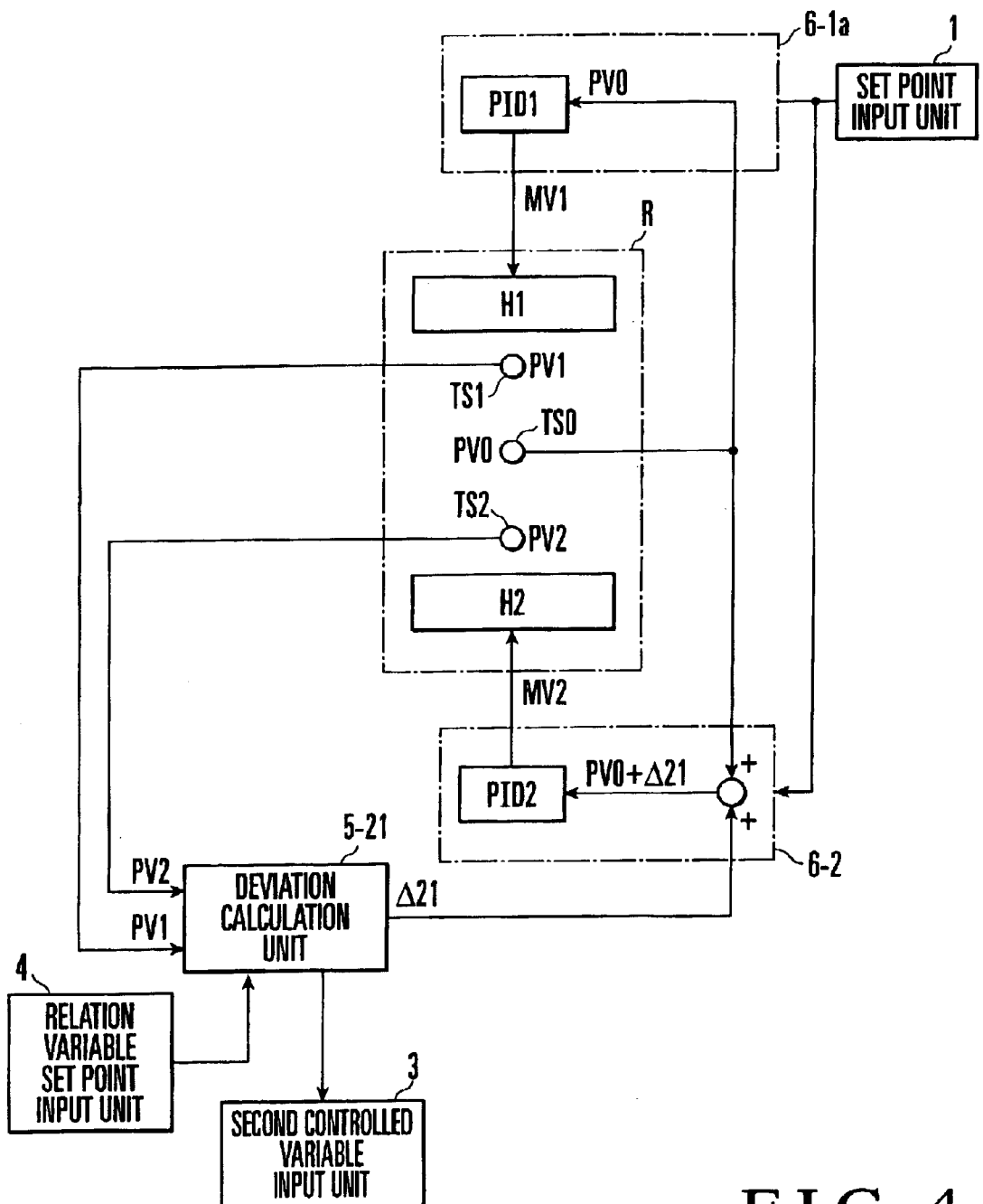
FIG. 4 is a block diagram showing the arrangement of a control apparatus according to the third embodiment of the present invention.

The third embodiment of the present invention will be described with reference to FIG. 4. In FIG. 4, the same reference numerals as in FIG. 3 denote the same parts. In the second embodiment, all building components regarding temperature control are mounted. Even when a minimum number of building components are mounted, like the third embodiment, the same effects can be obtained.

The third embodiment does not employ the deviation calculation unit 5-12 in the second embodiment. A control calculation unit 6-1a does not add a deviation Δ12 to a first controlled variable PV0, unlike the control calculation unit 6-1. More specifically, the control calculation unit 6-1a calculates a manipulated variable output MV1 to a heater H1 by equation (5) described above. Hence, the third embodiment can simplify the arrangement in comparison with the second embodiment.

[Fourth Embodiment]

The fourth embodiment of the present invention will be described with reference to FIG. 5. The fourth embodiment is another more detailed example of the first embodiment. A control apparatus according to the fourth embodiment relates to temperature difference control in the use of four control actuators (heaters H1, H2, H3, and H4).

The control apparatus comprises deviation calculation units 5-12b, 5-13b, 5-14b, 5-21b, 5-23b, 5-24b, 5-31b, 5-32b, 5-34b, 5-41b, 5-42b, and 5-43b which calculate deviations, a control calculation unit 6-1b which is connected to the deviation calculation units 5-12b, 5-13b, and 5-14b and calculates a manipulated variable output, a control calculation unit 6-2b which is connected to the deviation calculation units 5-21b, 5-23b, and 5-24b, a control calculation unit 6-3b which is connected to the deviation calculation units 5-31b, 5-32b, and 5-34b, and a control calculation unit 6-4b which is connected to the deviation calculation units 5-41b, 5-42b, and 5-43b.

The deviation calculation units 5-12b, 5-13b, and 5-14b are connected to a temperature sensor TS1. The deviation calculation unit 5-12b is further connected to a temperature sensor TS2; the deviation calculation unit 5-13b, to a temperature sensor TS3; and the deviation calculation unit 5-14b, to a temperature sensor TS4. The deviation calculation units 5-21b, 5-23b, and 5-24b are connected to the temperature sensor TS2. The deviation calculation unit 5-21b is further connected to the temperature sensor TS1; the deviation calculation unit 5-23b, to the temperature sensor TS3; and the deviation calculation unit 5-24b, to the temperature sensor TS4.

The deviation calculation units 5-31b, 5-32b, and 5-34b are connected to the temperature sensor TS3. The deviation calculation unit 5-31b is further connected to the temperature sensor TS1; the deviation calculation unit 5-32b, to the temperature sensor TS2; and the deviation calculation unit 5-34b, to the temperature sensor TS4. The deviation calculation units 5-41b, 5-42b, and 5-43b are connected to the temperature sensor TS4. The deviation calculation unit 5-41b is further connected to the temperature sensor TS1; the deviation calculation unit 5-42b, to the temperature sensor TS2; and the deviation calculation unit 5-43b, to the temperature sensor TS3.

The control calculation units 6-1b, 6-2b, 6-3b, and 6-4b are respectively connected to the heaters H1, H2, H3, and H4. The control calculation unit 6-4b is connected to a temperature sensor TS0.

Figure 5:
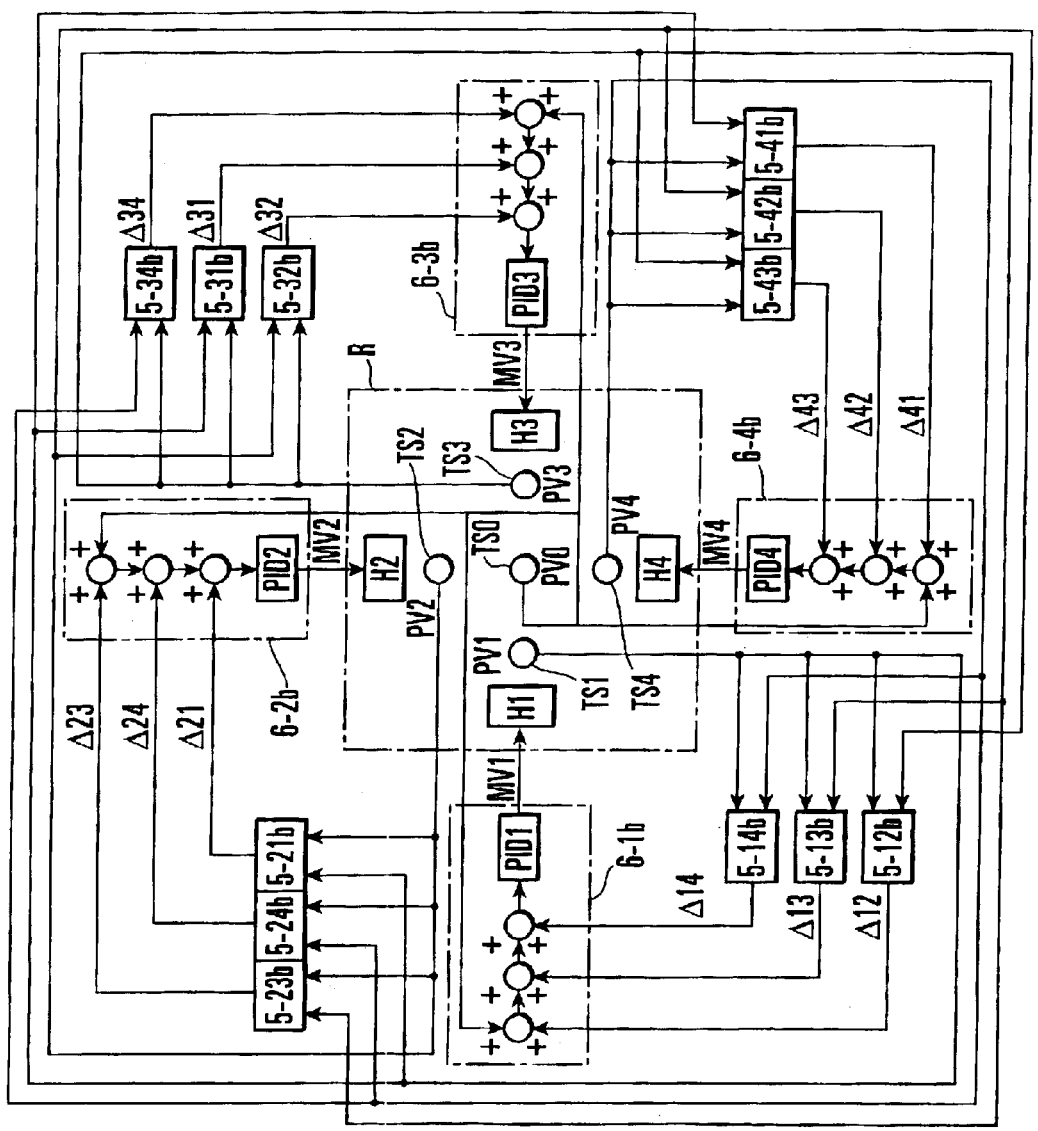
FIG. 5 is a block diagram showing the arrangement of a control apparatus according to the fourth embodiment of the present invention.

FIG. 5 does not illustrate a set point input unit 1, first controlled variable input unit 2, second controlled variable input unit 3, and relation variable set point input unit 4.

In a temperature control system according to the fourth embodiment, the temperature sensors TS0, TS1, TS2, TS3, and TS4 which measure temperatures PV0, PV1, PV2, PV3, and PV4, and the heaters H1, H2, H3, and H4 are arranged in a tank R.

The first purpose of the temperature control system is to make the temperature PV0 of the center in the tank R coincide with a predetermined set point SP.

The second purpose is to make the temperature difference between the temperatures PV1 and PV2 coincide with a predetermined relation variable set point d12, make the temperature difference between the temperatures PV1 and PV3 coincide with a predetermined relation variable set point d13, make the temperature difference between the temperatures PV1 and PV4 coincide with a predetermined relation variable set point d14, make the temperature difference between the temperatures PV2 and PV3 coincide with a predetermined relation variable set point d23, make the temperature difference between the temperatures PV2 and PV4 coincide with a predetermined relation variable set point d24, and make the temperature difference between the temperatures PV3 and PV4 coincide with a predetermined relation variable set point d34.

The temperature differences should not be inconsistent, and some temperature differences are inevitably determined as, e.g., d13=d12+d23.

Also in the fourth embodiment, the processing flow of the control apparatus is the same as that shown in FIG. 2.

The deviation calculation unit 5-12b calculates a deviation $\Delta 12$ between a temperature difference PV1−PV2 and the relation variable set point d12 by the following equation expressed by a transfer function on the basis of the second controlled variables PV1 and PV2 which are measured by the temperature sensors TS1 and TS2 and input from the second controlled variable input unit 3 (not shown), and the relation variable set point d12 input from the relation variable set point input unit 4 (not shown):

$$\Delta 12 = (PV1 - PV2 d12)K12/(1+T12s) \quad (11)$$

The deviation calculation unit 5-13b calculates a deviation $\Delta 13$ between a temperature difference PV1−PV3 and the relation variable set point d13 on the basis of the second controlled variables PV1 and PV3 and the relation variable set point d13:

$$\Delta 13 = (PV1 - PV3 - d13)K13/(1+T13s) \quad (12)$$

The deviation calculation unit 5-14b calculates a deviation $\Delta 14$ between a temperature difference PV1−PV4 and the relation variable set point d14 on the basis of the second controlled variables PV1 and PV4 and the relation variable set point d14:

$$\Delta 14 = (PV1 - PV4 - d14)K14/(1+T14s) \quad (13)$$

The deviation calculation unit 5-21b calculates a deviation $\Delta 21$ between the temperature difference PV1−PV2 and the relation variable set point d12 on the basis of the second controlled variables PV2 and PV1 and the relation variable set point d12:

$$\Delta 21 = (PV2 - PV1 + d12)K21/(1+T21s) \quad (14)$$

The deviation calculation unit 5-23b calculates a deviation $\Delta 23$ between a temperature difference PV2−PV3 and the relation variable set point d23 on the basis of the second controlled variables PV2 and PV3 and the relation variable set point d23:

$$\Delta 23 = (PV2 - PV3 - d23)K23/(1+T23s) \quad (15)$$

The deviation calculation unit 5-24b calculates a deviation $\Delta 24$ between a temperature difference PV2−PV4 and the relation variable set point d24 on the basis of the second controlled variables PV2 and PV4 and the relation variable set point d24:

$$\Delta 24 = (PV2 - PV4 - d24)K24/(1+T24s) \quad (16)$$

The deviation calculation unit 5-31b calculates a deviation $\Delta 31$ between the temperature difference PV1−PV3 and the relation variable set point d13 on the basis of the second controlled variables PV3 and PV1 and the relation variable set point d13:

$$\Delta 31 = (PV3 - PV1 + d13)K31/(1+T31s) \quad (17)$$

The deviation calculation unit 5-32b calculates a deviation $\Delta 32$ between the temperature difference PV2−PV3 and the relation variable set point d23 on the basis of the second controlled variables PV3 and PV2 and the relation variable set point d23:

$$\Delta 32 = (PV3 PV2 + d23)K32/(1+T32s) \quad (18)$$

The deviation calculation unit 5-34b calculates a deviation $\Delta 34$ between a temperature difference PV3−PV4 and the relation variable set point d34 on the basis of the second controlled variables PV3 and PV4 and the relation variable set point d34:

$$\Delta 34 = (PV3 - PV4 - d34)K34/(1+T34s) \quad (19)$$

The deviation calculation unit 5-41b calculates a deviation $\Delta 41$ between the temperature difference PV1−PV4 and the relation variable set point d14 on the basis of the second controlled variables PV4 and PV1 and the relation variable set point d14:

$$\Delta 41 = (PV4 - PV1 + d14)K41/(1+T41s) \quad (20)$$

The deviation calculation unit 5-42b calculates a deviation $\Delta 42$ between the temperature difference PV2−PV4 and the relation variable set point d24 on the basis of the second controlled variables PV4 and PV2 and the relation variable set point d24:

$$\Delta 42 = (PV4 - PV2 + d24)K42/(1+T42s) \quad (21)$$

The deviation calculation unit 5-43b calculates a deviation $\Delta 43$ between the temperature difference PV3−PV4 the relation variable set point d34 on the basis of the second controlled variables PV4 and PV3 and the relation variable set point d34:

$$\Delta 43 = (PV4 - PV3 + d34)K43/(1 + T43s) \quad (22)$$

In equations (11) to (22), K12, K13, K14, K21, K23, K24, K31, K32, K34, K41, K42, and K43 are gains for weighting in accordance with the importance of the second purpose. The gains are positive values larger than 0, and are generally 1. When the first purpose of making the temperature PV0 coincide with the set point SP is more important than the second purpose, the gains K12, K13, K14, K21, K23, K24, K31, K32, K34, K41, K42, and K43 are set small. When the second purpose is more important, the gains K12, K13, K14, K21, K23, K24, K31, K32, K34, K41, K42, and K43 are set large.

The fourth embodiment has a plurality of second purposes of making the temperature difference between the temperatures PV1 and PV2 coincide with the predetermined relation variable set point d12, making the temperature difference between the temperatures PV1 and PV3 coincide with the relation variable set point d13, making the temperature difference between the temperatures PV1 and PV4 coincide with the predetermined relation variable set point d14, making the temperature difference between the temperatures PV2 and PV3 coincide with the predetermined relation variable set point d23, making the temperature difference between the temperatures PV2 and PV4 coincide with the predetermined relation variable set point d24, and making the temperature difference between the temperatures PV3 and PV4 coincide with the predetermined relation variable set point d34. The priority levels of the second purposes can also be adjusted.

For example, if it is important to make the temperature difference between the temperatures PV1 and PV2 coincide with the relation variable set point d12, the gains K12 and K21 are set large. If it is important to make the temperature difference between the temperatures PV1 and PV3 coincide with the relation variable set point d13, the gains K13 and K31 are set large.

If it is important to make the temperature difference between the temperatures PV1 and PV4 coincide with the relation variable set point d14, the gains K14 and K41 are set large. If it is important to make the temperature difference between the temperatures PV2 and PV3 coincide with the relation variable set point d23, the gains K23 and K32 are set large.

If it is important to make the temperature difference between the temperatures PV2 and PV4 coincide with the relation variable set point d24, the gains K24 and K42 are set large. If it is important to make the temperature difference between the temperatures PV3 and PV4 coincide with the relation variable set point d34, the gains K34 and K43 are set large.

T12, T13, T14, T21, T23, T24, T31, T32, T34, T41, T42, and T43 are first-order lag filter time constants for avoiding abrupt changes in the deviations Δ12, Δ13, Δ14, Δ21, Δ23, Δ24, Δ31, Δ32, Δ34, Δ41, Δ42, and Δ43 caused by changes in the relation variable set points d12, d13, d14, d23, d24, and d34.

The first-order lag filter time constants T12, T13, T14, T21, T23, T24, T31, T32, T34, T41, T42, and T43 suffice to be set almost equal to, e.g., the integral times Ti1, Ti2, Ti3, and Ti4 of the control calculation units 6-1b, 6-2b, 6-3b, and 6-4b. In the fourth embodiment, T12=T13=T14=Ti1, T21=T23=T24=Ti2, T31=T32=T34=Ti3, and T41=T42=T43=Ti4.

The control calculation unit 6-1b calculates a manipulated variable output MV1 to the heater H1 by the following equation expressed by a transfer function on the basis of the set point SP input from the set point input unit 1 (not shown), the first controlled variable PV0 which is measured by the temperature sensor TS0 and input from the first controlled variable input unit 2 (not shown), and the deviations Δ12, Δ13, and Δ14 input from the deviation calculation units 5-12b, 5-13b, and 5-14b:

$$MV1 = Kg1\{1 + (1/Ti1s) + Td1s\} \times \{SP - (PV0 + \Delta 12 + \Delta 13 + \Delta 14)\} \quad (23)$$

The control calculation unit 6-2b calculates a manipulated variable output MV2 to the heater H2 on the basis of the set point SP, the first controlled variable PV0, and the deviations Δ21, Δ23, and Δ24 input from the deviation calculation units 5-21b, 5-23b, and 5-24b:

$$MV2 = Kg2\{1 + (1/Ti2s) + Td2s\} \times \{SP - (PV0 + \Delta 21 + \Delta 23 + \Delta 24)\} \quad (24)$$

The control calculation unit 6-3b calculates a manipulated variable output MV3 to the heater H3 on the basis of the set point SP, the first controlled variable PV0, and the deviations Δ31, Δ32, and Δ34 input from the deviation calculation units 5-31b, 5-32b, and 5-34b:

$$MV3 = Kg3\{1 + (1/Ti3s) + Td3s\} \times \{SP - (PV0 + \Delta 31 + \Delta 32 + \Delta 34)\} \quad (25)$$

The control calculation unit 6-4b calculates a manipulated variable output MV4 to the heater H4 on the basis of the set point SP, the first controlled variable PV0, and the deviations Δ41, Δ42, and Δ43 input from the deviation calculation units 5-41b, 5-42b, and 5-43b:

$$MV4 + Kg4\{1 + (1/Ti4s) + Td4s\} \times \{SP - (PV0 + \Delta 41 + \Delta 42 + \Delta 43)\} \quad (26)$$

Accordingly, the fifth embodiment can make the temperature PV0 of the center in the tank R accurately coincide with the set point SP. In addition, the fifth embodiment can make the temperature difference between the temperatures PV1 and PV2 coincide with the relation variable set point d12, make the temperature difference between the temperatures PV1 and PV3 coincide with the relation variable set point d13, make the temperature difference between the temperatures PV1 and PV4 coincide with the relation variable set point d14, make the temperature difference between the temperatures PV2 and PV3 coincide with the relation variable set point d23, make the temperature difference between the temperatures PV2 and PV4 coincide with the relation variable set point d24, and make the temperature difference between the temperatures PV3 and PV4 coincide with the relation variable set point d34.

The fourth embodiment can adjust the priority levels of the first and second purposes by the gains K12, K13, K14, K21, K23, K24, K31, K32, K34, K41, K42, and K43. The fourth embodiment can also adjust the priority levels of the second purposes.

In the fourth embodiment, time lag filtering is executed for the deviation Δ by the filter time constants T12, T13, T14, T21, T23, T24, T31, T32, T34, T41, T42, and T43. Abrupt changes in the deviations Δ12, Δ13, Δ14, Δ21, Δ23, Δ24, Δ31, Δ32, Δ34, Δ41, Δ42, and Δ43 by changes in the relation variable set points d12, d13, d14, d23, d24, and d34 during control can be avoided, realizing stable control.

[Fifth Embodiment]

Figure 6:
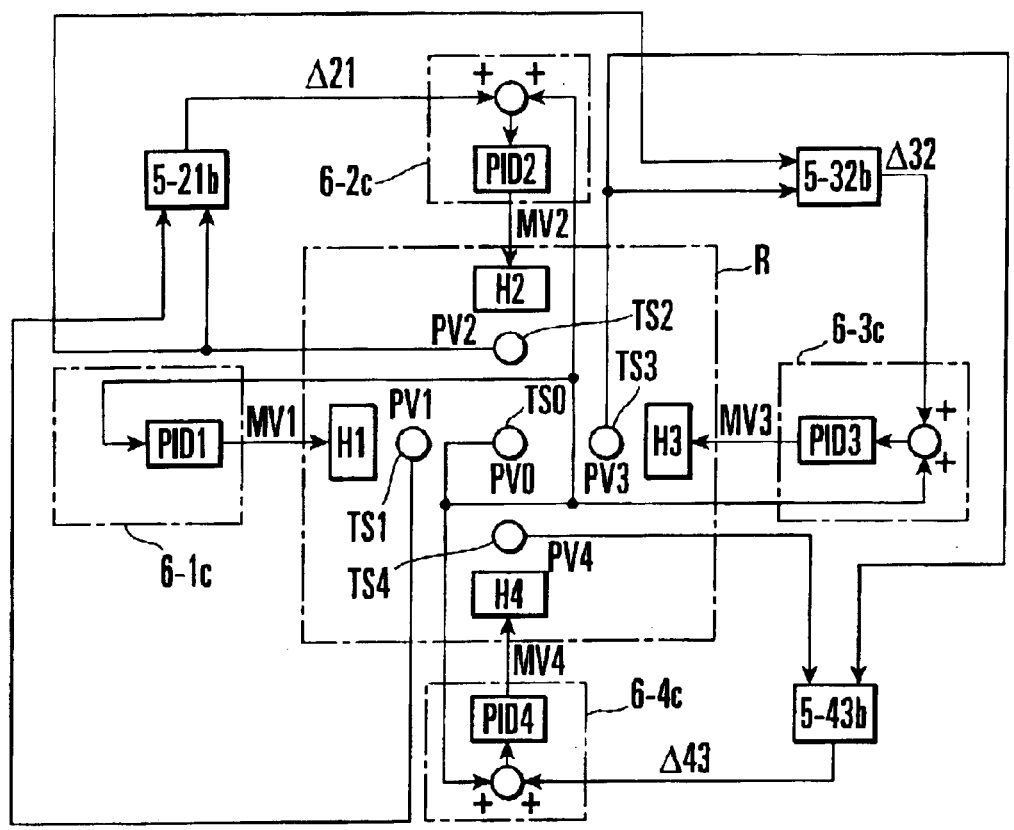
FIG. 6 is a block diagram showing the arrangement of a control apparatus according to the fifth embodiment of the present invention.

A control apparatus according to the fifth embodiment will be described. In FIG. 6, the same reference numerals as in FIG. 5 denote the same parts. In the fourth embodiment, all building components regarding temperature control are mounted. Even when a minimum number of building components are mounted, like the fifth embodiment, the same effects can be obtained.

A control calculation unit 6-1c is connected to a heater H1 and temperature sensor TS0, and calculates a manipulated variable output MV1 to the heater H1 by equation (5) described above. A control calculation unit 6-2c is connected to a heater H2, a deviation calculation unit 5-21b, and the temperature sensor TS0, and calculates a manipulated variable output MV2 to the heater H2 by equation (8) described above.

A control calculation unit 6-3c is connected to a heater H3, a deviation calculation unit 5-32b, and the temperature sensor TS0, and calculates a manipulated variable output MV3 to the heater H3:

$$MV3 = Kg3\{1+(1/Ti3s)+Td3s\}\{SP-(PV0+\Delta32)\} \quad (27)$$

A control calculation unit 6-4c is connected to a heater H4, a deviation calculation unit 5-43b, and the temperature sensor TS0, and calculates a manipulated variable output MV4 to the heater H4:

$$MV4 = Kg4\{1+(1/Ti4s)+Td4s\}\{SP-(PV0+\Delta43)\} \quad (28)$$

As a result, the fifth embodiment can simplify the arrangement in comparison with the fourth embodiment.

[Sixth Embodiment]

Figure 7:
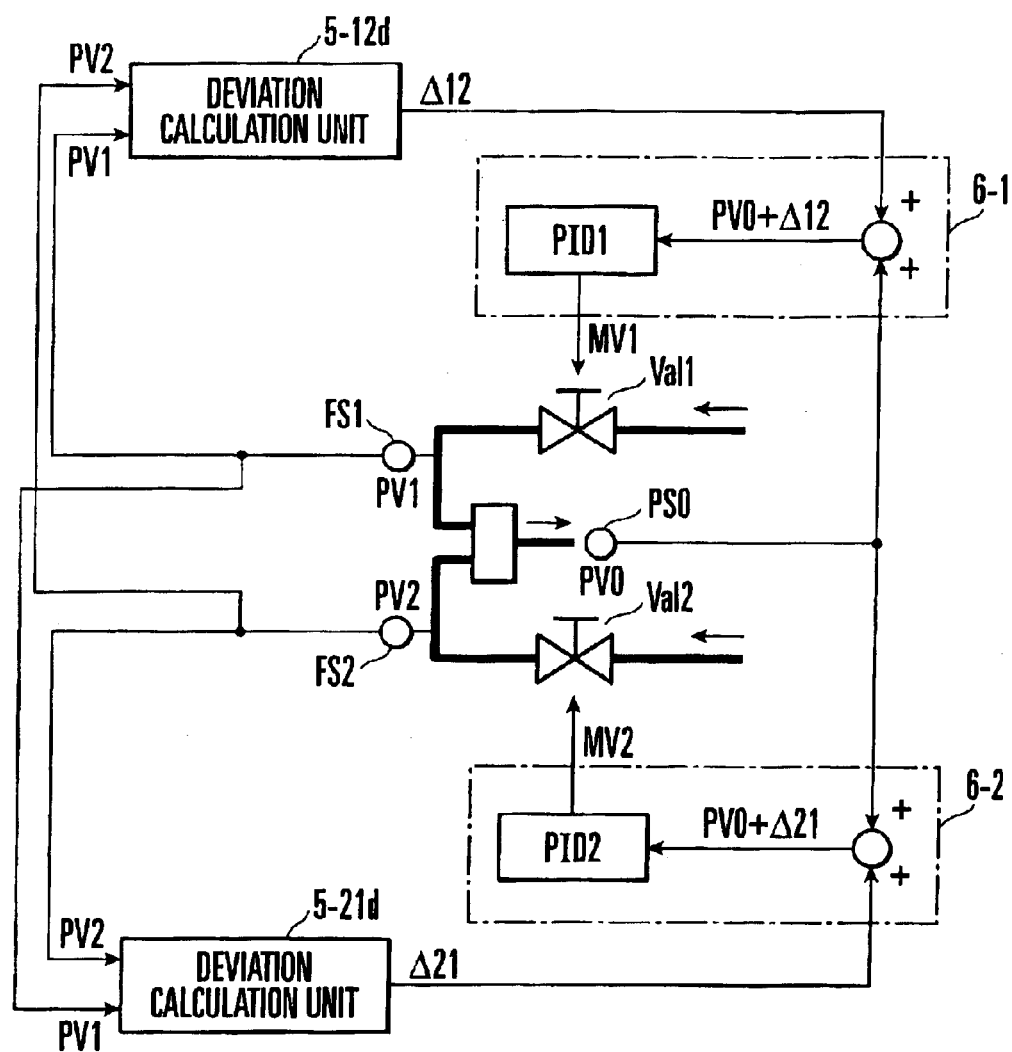
FIG. 7 is a block diagram showing the arrangement of a control apparatus according to the sixth embodiment of the present invention.

A control apparatus according to the sixth embodiment of the present invention will be described with reference to FIG. 7. The sixth embodiment is still another more detailed example of the first embodiment, and describes flow rate ratio control in the use of two control actuators (gas flow control valves Val1 and Val2).

The control apparatus comprises deviation calculation units 5-12d and 5-21d, and control calculation units 6-1 and 6-2. FIG. 7 does not illustrate a set point input unit 1, first controlled variable input unit 2, second controlled variable input unit 3, and relation variable set point input unit 4.

A pressure control system according to the sixth embodiment comprises a pressure sensor PS0 which measures a pressure (first controlled variable) PV0 of a mixture of two types of gases, the gas flow control valves Val1 and Val2 which control the flow rates of two types of gases, and flow sensors FS1 and FS2 which measure gas flow rates (second controlled variables) PV1 and PV2 controlled by the valves Val1 and Val2. The first purpose of the pressure control system is to make the pressure PV0 coincide with a predetermined set point SP.

The second purpose is to make the flow rate ratio (controlled variable ratio) of the flow rates PV1 and PV2 coincide with a predetermined relation variable set point d12.

Also in the sixth embodiment, the processing flow of the control apparatus is the same as that shown in FIG. 2.

The deviation calculation unit 5-12d calculates a deviation Δ12 between a flow rate ratio PV1/PV2 and the relation variable set point d12 by the following equation expressed by a transfer function on the basis of the second controlled variables PV1 and PV2 which are measured by the flow sensors FS1 and FS2 and input from the second controlled variable input unit 3 (not shown), and the relation variable set point d12 input from the relation variable set point input unit 4 (not shown):

$$\Delta12 = (PV1/PV2 - d12)K12/(1+T12s) \quad (29)$$

Similarly, the deviation calculation unit 5-21d calculates a deviation Δ21 between the flow rate ratio PV1/PV2 and the relation variable set point d12 by the following equation expressed by a transfer function on the basis of the second controlled variables PV1 and PV2, and the relation variable set point d12:

$$\Delta21 = (d12 - PV1/PV2)K21/(1+T21s) \quad (30)$$

In equations (29) and (30), K12 and K21 are gains for weighting the flow rate ratio of the flow rates PV1 and PV2 in accordance with the importance of coincidence with the relation variable set point d12. The gains are positive values larger than 0, and are generally 1. When the first purpose of making the pressure PV0 coincide with the set point SP is more important than the second purpose of making the flow rate ratio of the flow rates PV1 and PV2 coincide with the relation variable set point d12, the gains K12 and K21 are set small. When the second purpose is more important than the first purpose, the gains K12 and K21 are set large.

First-order lag filter time constants T12 and T21 for avoiding abrupt changes in the deviations Δ12 and Δ21 suffice to be set almost equal to, e.g., integral times Ti1 and Ti2 of the control calculation units 6-1 and 6-2. In the sixth embodiment, T12=Ti1 and T21=Ti2.

The control calculation unit 6-1 calculates a manipulated variable output MV1 to the gas flow control valve Val1 by equation (6) on the basis of the set point SP input from the set point input unit 1 (not shown), the first controlled variable PV0 which is measured by the pressure sensor PS0 and input from the first controlled variable input unit 2 (not shown), and the deviation Δ12 input from the deviation calculation unit 5-12d.

Similarly, the control calculation unit 6-2 calculates a manipulated variable output MV2 to the gas flow control valve Val2 by equation (8) on the basis of the set point SP, the first controlled variable PV0, and the deviation Δ21 input from the deviation calculation unit 5-21d.

With this processing, the sixth embodiment can make the pressure PV0 accurately coincide with the set point SP, and make the flow rate ratio of the flow rates PV1 and PV2 coincide with the relation variable set point d12. The sixth embodiment can adjust the priority levels of the first purpose of making the pressure PV0 coincide with the set point SP by the gains K12 and K21, and the second purpose of making the flow rate ratio of the flow rates PV1 and PV2 coincide with the relation variable set point d12.

In the sixth embodiment, time lag filtering is executed for the deviation Δ by the filter time constants T12 and T21. Abrupt changes in the deviations Δ12 and Δ21 by a change in the relation variable set point d12 during control can be avoided, realizing stable control.

[Seventh Embodiment]

Figure 8:
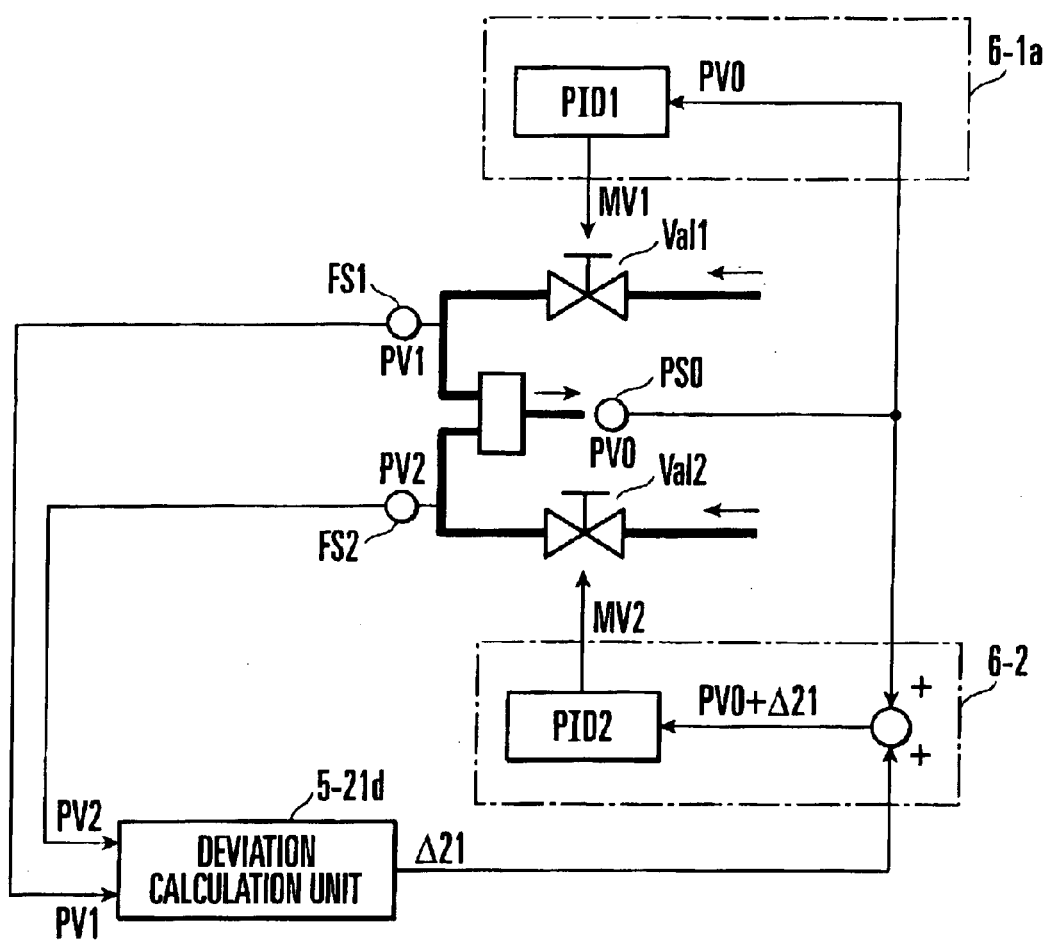
FIG. 8 is a block diagram showing the arrangement of a control apparatus according to the seventh embodiment of the present invention.

A control apparatus according to the seventh embodiment of the present invention will be described with reference to FIG. 8. In FIG. 8, the same reference numerals as in FIG. 7 denote the same parts. In the sixth embodiment, all building components regarding pressure control and flow rate ratio control are mounted. Even when a minimum number of building components are mounted, like the seventh embodiment, the same effects can be obtained.

The seventh embodiment does not employ the deviation calculation unit 5-12d in the sixth embodiment. A control calculation unit 6-1a does not add a deviation Δ12 to a first controlled variable PV0, unlike the control calculation unit 6-1. More specifically, the control calculation unit 6-1a calculates a manipulated variable output MV1 to a heater H1 by equation (5) described above. The seventh embodiment can therefore simplify the arrangement in comparison with the sixth embodiment.

In the above embodiments, the relation variable represents the relationship between two second controlled variables. The present invention can also be applied when one relation variable is obtained from three or more second controlled variables.

The present invention executes a deviation calculation procedure of calculating the relation variable between second controlled variables which are designated in advance from measured second controlled variables so as to maintain a predetermined relationship, and calculating a deviation serving as the difference between the calculated relation variable and a corresponding relation variable set point, and a feedback control calculation procedure of adding the calculated deviation to a measured first controlled variable, calculating a manipulated variable by performing feedback control calculation so as to make the sum coincide with a controlled variable set point, and outputting the manipulated variable to a corresponding control actuator.

These procedures can make the first controlled variable accurately coincide with a predetermined controlled variable set point, and make the relation variable between second controlled variables coincide with a predetermined relation variable set point.

The present invention can omit steps of investigating the relationship between controlled variables in advance before actual control. Without many steps, the first controlled variable can be easily made to coincide with a controlled variable set point, and the relation variable between second controlled variables can be made to coincide with a relation variable set point.

In addition, time lag filtering is performed for the deviation. An abrupt change in deviation by a change in relation variable set point during control can be avoided, realizing stable control.

A gain for weighting a corresponding deviation is multiplied in accordance with the importance of making the relation variable coincide with the relation variable set point. This setting allows adjusting the priority levels of the first purpose of making the first controlled variable coincide with a predetermined controlled variable set point, and the second purpose of making the relation variable between second controlled variables coincide with a predetermined relation variable set point.

When a plurality of second purposes exist, the priority levels of the second purposes can also be adjusted.

What is claimed is:

1. A control method comprising the steps of:

making a first controlled variable coincide with a predetermined controlled variable set point;

calculating a relation variable representing a relationship between second controlled variables which are designated in advance from measured second controlled variables different from the first controlled variable so as to maintain a predetermined relationship; and controlling a control actuator so as to make the calculated relation variable coincide with a predetermined relation variable set point, the controlling step including the steps of calculating a difference between the calculated relation variable and a relation variable set point corresponding to the calculated relation variable, adding the calculated difference to the measured first controlled variable, calculating a manipulated variable by performing feedback control calculation so as to make a sum coincide with the controlled variable set point, and outputting the calculated manipulated variable to a corresponding control actuator.

2. A method according to claim 1, wherein the step of calculating the difference comprises the step of performing time lag filtering for the difference.

3. A method according to claim 1, wherein the step of calculating the difference comprises the step of multiplying a gain for weighting a corresponding difference in accordance with importance of making the relation variable coincide with the relation variable set point.

4. A control apparatus comprising:

a plurality of control actuators which are arranged in correspondence with a plurality of second controlled variables;

relation variable calculation means for calculating a relation variable representing a relationship between second controlled variables which are designated in advance from measured second controlled variables so as to maintain a predetermined relationship;

difference calculation means for calculating, as a deviation, a difference between the calculated relation variable and a corresponding relation variable set point;

addition means for adding the deviation to a measured first controlled variable;

manipulated variable calculation means for calculating a manipulated variable so as to make a sum coincide with a controlled variable set point; and manipulated variable output means for outputting the manipulated variable to a corresponding control actuator.

5. An apparatus according to claim 4, wherein said difference calculation means performs time lag filtering for the deviation, and outputs the deviation having undergone time lag filtering to said addition means.

6. An apparatus according to claim 4, wherein said difference calculation means multiplies a corresponding deviation by a gain in accordance with importance of making the relation variable coincide with the relation variable set point, and the gain weights the deviation.

7. An apparatus according to claim 4, wherein said plurality of control actuators comprise heating or cooling actuators, said relation variable calculation means uses temperatures near said plurality of control actuators as the second controlled variables, and a temperature difference between different second controlled variables as the relation variable, and said addition means uses a temperature which can be controlled as the first controlled variable by said plurality of control actuators.

8. An apparatus according to claim 4, wherein said plurality of control actuators comprise gas flow control valves, said relation variable calculation means uses as the second controlled variables a plurality of gas flow rates which are controlled by said plurality of control actuators, and a flow rate ratio of different second controlled variables as the relation variable, and said addition means uses a gas mixture pressure which can be controlled as the first controlled variable by said plurality of control actuators.

9. An apparatus according to claim 4, wherein said manipulated variable calculation means calculates the manipulated variable by performing feedback control calculation.

10. An apparatus according to claim 4, further comprising set point input means for inputting a set point for the first controlled variable.

11. An apparatus according to claim 4, further comprising first controlled variable input means for inputting a first controlled variable measured by a sensor which is set at a first controlled variable measurement point.

12. An apparatus according to claim 4, further comprising second controlled variable input means for inputting second controlled variables measured by sensors which are set at second controlled variable measurement points.

13. An apparatus according to claim 4, further comprising relation variable set point input means for inputting a relation variable set point for a relation variable between second controlled variables.

14. An apparatus according to claim 13, wherein either of a controlled variable difference and a controlled variable ratio is used as the relation variable between the second controlled variables.

15. An apparatus according to claim 4, wherein letting PVj and PVi be second controlled variables, dij be a relation variable set point for a relation variable between the second controlled variables PVj and PVi, and $\Delta ji$ be a deviation, said difference calculation means calculates a deviation $\Delta ji$:

$$\Delta ji = PVj - PVi + dij$$

($i \neq j$: i and j are integers of 1 (inclusive) to n (inclusive)).

16. An apparatus according to claim 4, wherein letting PVj and PVi be second controlled variables, dij be a relation variable set point for a relation variable between the second controlled variables PVj and PVi, and $\Delta ji$ be a deviation, said difference calculation means calculates a deviation $\Delta ji$:

$$\Delta ji = PVj/PVi + dij$$

($i \neq j$: i and j are integers of 1 (inclusive) to n (inclusive)).

17. An apparatus according to claim 4, wherein letting MV be a manipulated variable for a control actuator which mainly influences a second controlled variable PV, Kg, Ti, and Td be a proportional gain, an integral time, and a derivative time of said manipulated variable calculation means, PV0 be a first controlled variable, $\Delta$ be a deviation, and s be a Laplace operator, said manipulated variable calculation means calculates the manipulated variable:

$$MV = Kg\{1 + (1/Tis) + Tds\}(SP - (PV0 + \Delta)).$$

* * * * *